(12) United States Patent
Brown et al.

(10) Patent No.: US 6,793,898 B2
(45) Date of Patent: Sep. 21, 2004

(54) COMPACT PLASMA-BASED FUEL REFORMER

(75) Inventors: Christopher Stewart Brown, Burlington (CA); Frederick Jacobus Kirstein, Oakville (CA); Paul Francis Martin, Toronto (CA); Harold Troy Wong, Toronto (CA)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 10/219,153

(22) Filed: Aug. 15, 2002

(65) Prior Publication Data

US 2004/0033177 A1 Feb. 19, 2004

(51) Int. Cl.[7] ............................................. B01J 19/08
(52) U.S. Cl. ........................... 422/186.21; 422/186.22; 123/DIG. 12
(58) Field of Search ....................... 422/186.21, 186.22; 123/DIG. 12

(56) References Cited

U.S. PATENT DOCUMENTS 5,425,332 A    6/1995  Rabinovich ................. 123/3
5,437,250 A    8/1995  Rabinovich ................. 123/3
6,322,757 B1 * 11/2001 Cohn et al. ............ 422/186.04

* cited by examiner

Primary Examiner—Steven Versteeg
(74) Attorney, Agent, or Firm—Frank C. Turner

(57) ABSTRACT

A plasma-based fuel reformer in which a fuel/air mixture is subjected to an electrical plasma arc that reforms the fuel/air mixture into a hydrogen-rich gas. The reformer includes a first electrode defining a reaction chamber and a second electrode axially aligned with the longitudinal axis of the first electrode. A plasma arc forms between the first and the second electrodes in the reaction chamber when an electrical voltage is applied. An insulator is positioned between the first and the second electrode to prevent the formation of a plasma arc between the first and the second electrodes except in the reaction chamber. Means for providing a fuel/air mixture to the reaction chamber and means for diverting the air flow into the reaction chamber so as to create a vortex-like flow of air in the reaction chamber are also included.

26 Claims, 1 Drawing Sheet

COMPACT PLASMA-BASED FUEL REFORMER

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage that inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen-rich gas stream that can be used Asia feed for fuel cells.

Hydrocarbon-based fuels, such as natural gas, LPG, gasoline, diesel, and fuel oil require conversion processes to be used as fuel sources for most fuel cells. One current art process uses a multi-step process combining an initial conversion process with several clean-up processes. The initial process is most often steam reforming (SR), autothermal reforming (ATR), catalytic partial oxidation (CPOX), or noncatalytic partial oxidation (POX). The clean-up processes are usually comprised of a combination of desulfurization, high temperature water-gas shift, low temperature water-gas shift, selective CO oxidation, or selective CO methanation. Alternative processes include hydrogen selective membrane reactors and filters; however, these have not seen wide application due to expense and technical problems with the technology.

Plasma fuel converters such as plasmatrons reform hydrocarbons to produce a hydrogen-rich gas. DC arc plasmatrons have received particular attention in the prior art. See, for example, U.S. Pat. Nos. 5,425,332 and 5,437,250. DC arc plasmatrons typically operate at low voltage and high current. By operating at high currents and lower voltages, the arc current is high enough that precautions are required to minimize electrode erosion and even melting. High flow rates of cooling water are required to keep the erosion in check. Air flow is required to simultaneously center the discharge on the cathode tip (made of hafnium or other specialized material, embedded in a copper plug) and to move the root of the arc at the anode to minimize erosion at the anode. A constriction is also required to increase the impedance of the discharge (i.e., to operate at high voltages and lower currents than free-flowing arcs). The air flows and the constriction are likely to require operation at elevated pressure (as much as 0.5 bar above ambient pressure), and thus a compressor is likely to be required. Even with these precautions, it is often difficult to extend the lifetime of the electrodes.

Plasmatrons also require relatively sophisticated power supplies for stabilization of the arc discharge. Further, plasmatrons have a limited capability for low power operation. In some reforming applications, the minimum operating power can be significantly greater than needed resulting in unnecessary power loss. DC arc plasmatrons are typically operated at power levels of one kilowatt or more.

Despite the above work, there remains a need for a simple unit for converting a hydrocarbon fuel to a hydrogen-rich gas stream for use with a fuel cell. In particular it is desirable to have a plasma-based fuel reformer that does not require a compressor or a sophisticated power supply for stabilization of the arc discharge. It is also desirable to have a plasma-based fuel reformer having longer electrode life and with a capability of lower power operation when lower flow rates of hydrogen-rich gas are required.

SUMMARY OF THE INVENTION

The present invention relates to a plasma-based fuel reformer in which a fuel/air mixture is subjected to conditions including an electrical plasma arc that reforms the fuel/air mixture into a hydrogen-rich gas.

One illustrative embodiment of the present invention is a reactor for carrying out a plasma-based fuel reforming reaction of a fuel/air mixture. In an illustrative embodiment, the reactor includes: a first electrode, a second electrode, and insulator positioned substantially between the first and second electrode except in the area of the reaction chamber; means for providing a fuel/air mixture, and means for providing sufficient voltage to the first and second electrode so as to create a plasma arc between the first and second electrode and that reforms the fuel/air mixture into a hydrogen-rich gas. A preferred illustrative embodiment of the present invention includes a first electrode, in which the first electrode has an inner and outer wall and a longitudinal axis, and in which the inner wall defining a reaction chamber for carrying out the plasma-based fuel/air reforming reaction. The second electrode in such an illustrative embodiment is axially aligned with the longitudinal axis of the first electrode and positioned in the reaction chamber such that when an electrical voltage is applied to the first and second electrodes a plasma arc forms between the first and the second electrode in the reaction chamber. In order to prevent the formation of the plasma arc in a location other than in the reaction chamber, the illustrative embodiment includes an insulator which is positioned between the first and the second electrode so as to prevent the formation of a plasma arc between the first and the second electrodes.

Means for providing a fuel/air mixture to the reaction chamber is also included in the present illustrative embodiment. In one preferred and illustrative embodiment the means for providing a fuel/air mixture to the reaction chamber includes a fuel line axially aligned with the second electrode, the fuel line having a first end and a second end, the first end being in fluid communication with a fuel source and the second end being in fluid communication with a fuel injector, the fuel injector being positioned to inject fuel into the reaction chamber.

Means for diverting the air flow into the reaction chamber is also included in the present illustrative embodiment so as to create a vortex-like flow of air in the reaction chamber. In one illustrative embodiment the means for diverting the airflow into the reaction chamber includes an air flow diverter. The airflow diverter is in fluid communication with a source of air and positioned such that air provided to the airflow diverter by the air source is diverted into the reaction chamber in a vortex-like manner. In one particularly preferred illustrative embodiment, the airflow diverter is helical and is axially aligned with the longitudinal axis of the first electrode.

One illustrative embodiment of the plasma-based fuel reformer disclosed herein includes an exhaust manifold that forms the second end of the first electrode. The exhaust manifold is in fluid communication with the reaction chamber and is positioned so as to direct the flow of hydrogen-rich gas to an exhaust outlet. The exhaust manifold is preferably designed in a manner that promotes the fuel reforming reaction by controlling the pressure of gases entering and exiting the reaction chamber.

As is the case in all of the above illustrative embodiments, it is preferred that the fuel and air mixture provided to the plasma-based fuel reformer is reacted in the reaction chamber so as to form a hydrogen-rich gas. This hydrogen-rich gas may then be used in a wide variety of applications including use as the feed gas for a fuel cell, feed gas for a purification reactor so as to provide substantially pure hydrogen gas, or other suitable applications.

When in use, the plasma-based fuel reformers of the present invention require an electrical power source that can supply sufficient voltage to the first and second electrodes so as to cause the formation of a plasma arc between the two. The voltage necessary to cause the formation of a plasma arc between the first and second electrode depends upon many variables including the spacing of the gap between the two, the relative configuration of the two electrodes and the materials from which the two electrodes are made. In any case, the plasma arc should be sufficient to carry out the fuel/air reformation reaction and the formation of the hydrogen-rich gas. In one preferred and illustrative embodiment, the voltage provided is in the range of approximately 100 volts to about 40 kilovolts and current in the range of approximately 10 milliamperes to about one ampere is sufficient to generate a plasma arc that reforms the fuel/air mixture into the hydrogen-rich gas.

The plasma-based fuel reformer of the present invention may be used in a number of applications, including use as an anode tail gas oxidizer for a fuel cell or as the primary fuel reformer in a hydrogen-rich gas generation system. Other illustrative uses of the plasma-based fuel reformer of the present invention should be apparent to one of skill in the art.

BRIEF DESCRIPTION OF THE DRAWINGS

The description is presented with reference to the accompanying drawing in which.

DESCRIPTION OF ILLUSTRATIVE EMBODIMENTS

Figure 1:
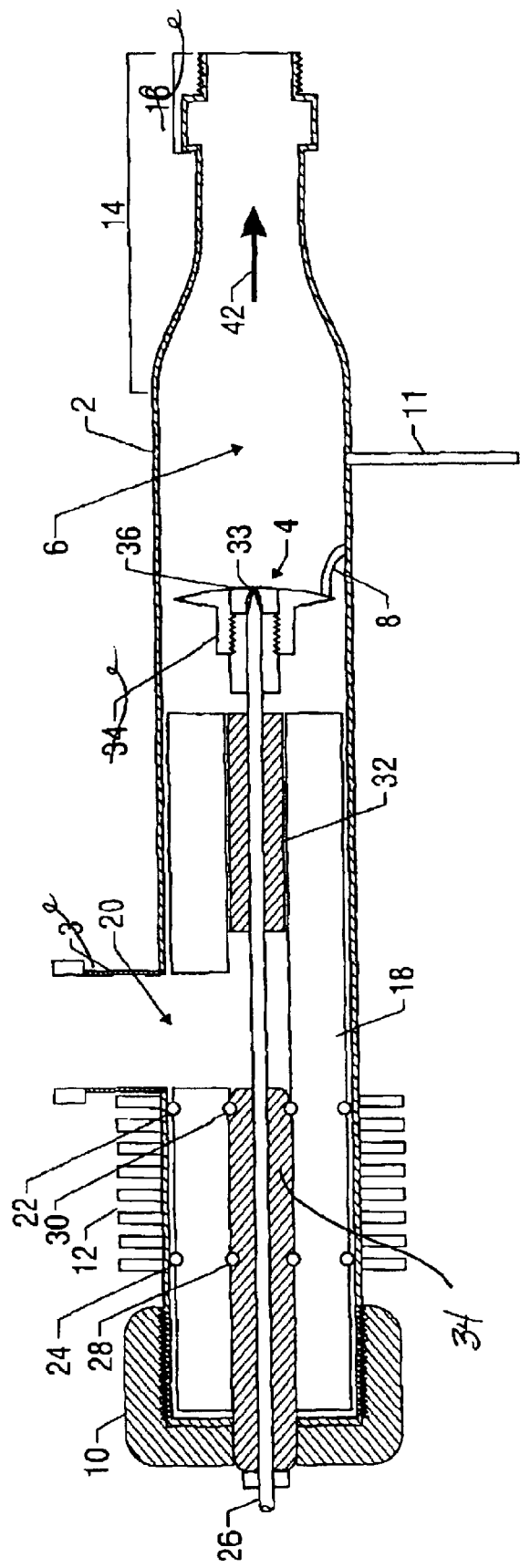
FIG. 1 shows a cross-sectional view of an illustrative plasma-based fuel reformer of the present invention.

The present invention is generally directed to a plasma-based fuel reformer that may utilize a wide range of hydrocarbon based fuels. As used in the present disclosure the term "fuel" means any suitable hydrocarbon fuel for carrying out the fuel reformation reaction. Illustrative examples of suitable fuels include: gaseous hydrocarbons such as methane (i.e. natural gas) ethane, propane and the like, liquid hydrocarbons such as ethanol, liquefied petroleum gas, (LPG), gasoline, aviation gasoline, naphtha, heavy cracked naphtha, diesel, fuel oil, mixtures of these and other similar hydrocarbons.

The term "air" is used in the present disclosure to mean any suitable gaseous mixture that contains sufficient oxygen content to carry out a fuel reformation reaction. Illustrative examples of "air" include: natural breathing air, oxygen or oxygen enriched breathing air; anode tail gas from a fuel cell; or mixtures of such gases as may be used.

The phrase "fuel/air" mixture as is used in the present disclosure means a mixture of vaporized or atomized fuel and air in a ratio suitable for carrying out a fuel reforming reaction in which a hydrogen-rich gas is generated. The ratio of fuel to air may be varied considerably depending upon the oxygen content of the air utilized. When the fuel content is in excess of the stoichiometric amount required to carry out the fuel reforming reaction for air having a certain oxygen content, the fuel/air mixture is considered to be "fuel rich." When the fuel content is less than the stoichiometric amount required to carry out the fuel reforming reaction for air having a certain oxygen content, the fuel/air mixture is considered to be "fuel lean." One of skill in the art should be able to determine the oxygen content of a given "air" feed and thus be able to determine if a particular fuel/air mixture is fuel rich or fuel lean. The fuel-air mixture is selected for operation between stoichiometric partial oxidation and full combustion depending on conditions and applications.

Generally the plasma-based fuel reformer of the present invention includes an electrically conductive structure forming a first electrode and a second electrode that is positioned relative to the first electrode to create a gap with respect to the first electrode in a reaction chamber. A fuel/air mixture is introduced into the gap and a power supply connected to the first and second electrodes provides sufficient voltage to generate a discharge to reform the fuel. The discharge can be a "glow type" discharge, a silent discharge and/or a breakdown discharge.

The voltage applied to the first and second electrodes is in the range of approximately 100 volts to about 40 kilovolts and current in the range of approximately 10 milliamperes to about one ampere to generate a discharge to reform the fuel. A preferred range for voltage is about 200 volts to about 20 kilovolts. In an illustrative embodiment, the power supply is a current controlled, high voltage power supply such as a power supply including a saturable inductor to limit current. The saturable inductor power supply may be a transformer power supply of a type that is commercially available and is used for neon or other gas discharge type signs. An alternative and illustrative embodiment includes more than one power supply so as to provide for simultaneous operation in a low voltage, high current DC arc mode and a high voltage, low current glow discharge mode. The electrical characteristics of the plasma operation are a voltage range from a few hundred volts and up to about 40 kilovolts, and a current range from about 10 milliamperes to hundreds of milliamperes.

Turning now to FIG. 1, an illustrative embodiment of the present invention is shown in cross-sectional view.

The illustrated plasma-based fuel reformer includes a first electrode (2), a second electrode (generally indicated by arrow 4). The first and second electrodes are positioned relative to each other in a reaction chamber (6) so that when a power supply is connected to the first and second electrodes sufficient voltage is provided to generate a discharge (8) sufficient to reform a fuel air mixture. The discharge can be a "glow type" discharge, a silent discharge and/or a breakdown discharge.

The first electrode is composed of a conductive substance, preferably metal, and more preferably alloy steel. However other conductive substances may be used so long as they are capable of conducting electricity and able to withstand the temperature and pressure conditions of the reactor. For example composite type materials may be used in which the inner surface of the reaction chamber is metal however the outer and surrounding supporting structure is made from a polymer or high temperature resistant cured resin reinforced by carbon fibers, glass fibers, metal fibers or the like.

As shown in FIG. 1, the first electrode is preferably a cylinder having a central axis and an inner wall and an outer wall in which the inner wall is smaller in diameter than the outer wall. The cylinder defines a reaction chamber (6) that is axially aligned with the central axis of the hollow cylinder. Although the first electrode is preferably cylindrical in shape, it may also be polygonal in shape if desired. Further, the entire length of the first electrode need not be the same shape. That is to say certain portions may be cylindrical and other portions polygonal.

As shown, the first electrode has a first end and a second end, the two ends defining a flow direction (42) from the first end to the second end. This flow direction is generally indicative of the flow, each in turn, of the air, the fuel/air mixture and the hydrogen-rich exhaust gas.

In a preferred embodiment, the plasma-based fuel reformer includes an exhaust manifold (14) that forms the second end of the first electrode. The exhaust manifold is in fluid communication with the reaction chamber (6) and generally forms the second end of the first electrode. The exhaust manifold may be designed to increase residence time in a high temperature reaction zone formed by the reaction of the fuel/air mixture in the plasma arc. Alternatively, the exhaust manifold may be designed to minimize the pressure drop across the plasma-based fuel reformer of the present invention. One of skill in the art should be able to readily design such variations by the inclusion of constrictions or expansions, baffles or other similar means. A heat exchanger may also be provided as part of the exhaust manifold to decrease power needed from the power supply by decreasing the thermally induced resistance of the first electrode.

The first electrode also includes an electrical connection point (11) that allows for the electrical connection of the first electrode to the power supply. Also located between the first end and the second end, the first electrode includes an air inlet manifold that is in fluid communication with the reaction chamber (6). As will be described in greater detail below, the air manifold defines an air inlet port (20) which introduces air into the reaction chamber (6) by way of a helical air flow director. At this point suffice it to say that air provided under pressure to the air manifold makes its way to the reaction chamber to be mixed with fuel and reacted to form the hydrogen-rich exhaust gas.

As is illustrated, the first electrode includes at least one heat sink (12). Such heat sinks are in thermal communication with the first electrode and serve to maintain the first electrode at a temperature that optimizes the production of hydrogen-rich exhaust gas. In the present illustrative embodiment, the heat sink is an air-cooled fin type heat exchanger. Other types of heat sinks may be used including liquid cooled heat sinks, heat pipes or other suitable heat transferring devices known to one of skill in the art. The illustrated heat sink is in spatial proximity to the first end of the first electrode and serves a dual function to dissipate heat from the first electrode and to thermally protect the O-rings from the heat generated by the reformation reaction. Alternative positions for heat sinks should be readily determinable by the design criteria and through trial and error by one of skill in the art. For example it may be desirable to jacket areas proximate to the second end of the first electrode immediately surrounding the reaction chamber to withdraw excess heat. Alternatively, a fluid cooled heat exchanger/jacket may be used around the exhaust manifold to cool the hydrogen-rich exhaust gas prior to further use. Such alternatives should be apparent to one of ordinary skill in the art.

As previously noted, the present invention includes a second electrode that is positioned relative to the first electrode such that the provision of a suitable electrical voltage causes a discharge that is suitable for reforming a fuel/air mixture. As is illustrated in FIG. 1, such a second electrode is composed of a second electrode body (34) surrounding a tubular fuel line (26). Naturally, the fuel line has a first end in fluid communication with a fuel source and a second end in fluid communication with a fuel injector tip (33). The fuel line is generally axially aligned with the axis of the first electrode. The previously mentioned fuel injector tip (33) is designed and positioned so as to inject fuel into the reaction chamber. The fuel injector tip may be a spray type or jet type tip used in automotive fuel injectors or alternatively it may be an atomizing type injector tip that forms a very fine spray of fuel. In all instances, the fuel injector tip is designed so as to provide sufficient fuel to be mixed with air so as to optimize the formation of hydrogen-rich exhaust gas.

As illustrated, the second electrode also includes an airflow baffle (32) that like the electrode body surrounds the axially aligned fuel line. On one end the airflow baffle (32) is designed to be in fluid communication with the air manifold and the air inlet port (20). The airflow baffle is also in fluid communication with the reaction chamber on a second down-flow end. The role of the airflow baffle is to direct the flow of air in the reaction chamber in a desirable manner. In the preferred and illustrated embodiment shown in FIG. 1, the air flow baffle is helical in shape and the helix in generally axially aligned with the axis of the first electrode. Thus in operation, the illustrated air flow baffle creates a vortex-like flow of air in the reaction chamber. This vortex-like flow of air is designed to create an environment in the reaction chamber so that the discharge is not localized in any one fixed position. That is to say, the airflow into the reaction chamber is designed so that the electrical discharge moves preferably in a circular or axial manner. The movement of the discharge allows for a more efficient fuel/air reformation reaction and prolongs the life of the electrodes. The airflow baffle is preferably made of metal, however other suitable materials may be used such as composites as described above or other similar materials.

The second electrode also includes a planar annular disk plasma arc platform (36) positioned within the reactor chamber such that a plasma arc (8) is formed between the planar annular disk plasma arc platform and the inner wall of the first electrode. The planar annular disk is preferably in electrical communication with the other conductive components of the second electrode. Due to the discharge and reactor conditions, the planar annular disk plasma arc platform is preferably made of metal, although metal containing composite materials could also be used. The gap that is formed between the planar annular disk plasma arc platform and the inner wall of the first electrode should be of a size to permit the formation of the electrical discharge. Further the annular disk plasma arc platform is designed so that the vortex-like motion of the air entering the reaction chamber causes a pseudo random movement of the discharge. One of skill in the art should appreciate that such motion extends the useful life of the electrodes.

In order to ensure that the discharge only forms in the reaction chamber, an insulator (18) is inserted between the first and second electrodes. The insulator is defined by a first wall having a diameter slightly less than the diameter of the inner wall of the first electrode and a second wall having a diameter slightly greater than the diameter of the second electrode body. An air inlet port is present in the wall of the insulator to allow the passage of air from the air manifold, through the air inlet port, then through the airflow baffle and finally into the reaction chamber. The insulator may be made of any suitable electrically insulating material, however, ceramic is preferred. One of skill in the art should, upon review, appreciate that the illustrative embodiment minimizes the ceramic machining of the insulator and provides for a measure of freedom in the tolerances required for both the ceramic parts.

Even though the insulator is made with a diameter that is slightly smaller than the inner diameter of the first electrode, a first pair of pressure sealing elements (22 and 24), preferably O-rings, are positioned between the first electrode and the insulator so as to form a pressure tight seal between the two. In a similar manner, a second pair of pressure sealing elements (28 & 30), preferably O-rings, are positioned between the second electrode body and the insulator so as to form a pressure tight seal between the two. The role of the pressure sealing elements is to provide an air tight seal, but also is' designed to take into account the differences in the thermal coefficient of expansion between the two electrodes and the insulator. The O-rings are utilized in the present illustrative embodiment to minimize the gasket seating stresses and sealing problems exhibited by the prior art.

An endcap (10) is mechanically threaded on the first end of the first electrode and prevents the second electrode and insulator from moving relative to the first electrode when the reactor is operating. In order to prevent electrical communication between the two electrodes at a point other than in the reaction chamber, the end cap is preferably made from an insulator material. In one illustrative and preferred embodiment, the endcap is made of non-conductive polymer, especially polyvinylchloride or other similar material.

Operation of the plasma-based fuel reformer of the present invention should be apparent to one of skill in the art. An air source is connected to the air manifold so as to provide a supply of air. The fuel line is connected to a fuel source that includes a fuel pump, and thus provides fuel under pressure to the fuel line. The first and second electrodes are connected to a suitable power source as described above. Upon application of an appropriate electrical voltage, a discharge forms between the first and second electrodes in the reaction chamber. Air and fuel are provided through their respective passages and are mixed in the reaction chamber. The fuel/air mixture reacts in the presence of the discharge and reformed into a hydrogen-rich exhaust gas. The hydrogen-rich exhaust gas exits the reaction chamber via the exhaust manifold.

Upon consideration and review, one of skill in the art should appreciate that the present illustrative embodiment exhibits many advantageous aspects not found in the prior art. For example, because of the larger flow passages used in delivering the air and removing the hydrogen-rich exhaust, both the air paths and the hydrogen-rich exhaust gas exhibit a relatively low-pressure drop. Further it should be appreciated that the pressurization of the liquid fuels utilized in the illustrative embodiment, is generally well known and practiced in conventional internal combustion engine designs. Thus, pressurized liquid fuel is injected into the reaction chamber and at the same time mixed with the air component and in turn reformed into hydrogen-rich exhaust gas. This is in contrast with the prior art which makes use of compressed air to form the fuel air mixture.

Although the illustrated plasma-based fuel reformer shown in FIG. 1 has only one plasma region, an alternative embodiment may include a plurality of plasma regions to increase hydrogen generation rate. In such instances a plurality of first and second electrodes may be connected to a shared power source as well as other shared components. The hydrogen-rich gas output of the plasma-based fuel reformer may be brought into contact with a catalyst such as for nitrogen oxide catalyst regeneration.

High hydrogen production rates are possible by using multiple units. A further increase in hydrogen production rate is possible by increasing the air/fuel ratio and the fuel throughput.

The plasma-based fuel reformer of the present invention has many potential applications and uses that one of skill in the art should appreciate. One such illustrative application is as the anode tail gas oxidizer for a PEM type fuel cell. It should be appreciated that the operation of a PEM type fuel cell results in the formation of a tail gas from the anode that principally contains nitrogen gas but also may contain unreacted hydrogen, methane or other light hydrocarbons and the like. Prior to venting such anode tail gas to the atmosphere, the anode tail gas should be oxidized for both environmental and safety reasons. As described in literature, the anode tail gas is typically oxidized to carbon dioxide and water using a catalyst based oxidation reactor. However, such catalyst based oxidation reactors may be expensive because of the precious metal content of the catalysts. Thus the plasma-based fuel reformer of the present invention may be used to replace the catalyst based anode tail gas oxidation reactors.

In one such illustrative embodiment a conventional PEM fuel cell is in operative relationship with a source of substantially pure hydrogen gas. The anode tail gas generated by the fuel cell is routed to a plasma-based fuel reformer of the type disclosed herein. Because of the low-pressure drop, pressurization of the anode tail gas is not required prior to feeding to the plasma-based fuel reformer. The anode tail gas generally is composed of unreacted hydrogen along with methane or other unreformed light hydrocarbons, carbon dioxide and nitrogen gas. This gas is fed to the plasma-based fuel reformer where it is fully oxidized.

In another illustrative application and use of the plasma-based fuel reformer of the present invention, a substantially pure hydrogen gas generation system is designed such that a partial oxidation reactor is downstream of the plasma-based fuel reformer of the present invention. In such instances additional oxygen may be required to be injected into the hydrogen-rich gas generated by the plasma-based fuel reformer of the present invention. The oxygen is generally provided by additional air mixed into the hydrogen-rich exhaust generated by the plasma-based fuel reformer of the present invention. In this case the hydrogen yield generated by the plasma-based fuel reformer of the present invention may be reduced, but the electrical power requirement is decreased. One of skill in the art should appreciate that there exists a tradeoff between the electrical power requirement for the plasma and the fuel required in the fuel converter. Using this approach, it is possible to decrease the electrical power required by the plasma-based fuel reformer of the present invention and thus increasing the lifetime of the electrodes and the lifetime cost of the plasma fuel converter. Alternatively it is also possible to inject additional amounts of fuel after the plasma-based fuel reformer and produce a final gas composition close to those required by a catalyst based fuel reformation reaction.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A plasma-based fuel reformer comprising: a first electrode, wherein the first electrode has an inner and outer wall and a longitudinal axis, the inner wall defining a reaction chamber; a second electrode, the second electrode being axially aligned with the longitudinal axis of the first electrode and positioned in the reaction chamber such that when an electrical voltage is applied to the first and second electrodes a plasma arc forms between the first and the second electrode in the reaction chamber an insulator, wherein the insulator is positioned between the first and the second electrode so as to prevent the formation of a plasma arc between the first and the second electrodes except in the reaction chamber; means for providing a fuel/air mixture to the reaction chamber wherein the means for providing a fuel/air mixture to the reaction chamber includes a fuel line axially aligned with the second electrode; means for diverting the air flow into the reaction chamber.

2. The plasma-based fuel reformer of claim 1, wherein the fuel line has a first end and a second end, the first end being in fluid communication with a fuel source and the second end being in fluid communication with a fuel injector, the fuel injector being positioned to inject fuel into the reaction chamber.

3. The plasma-based fuel reformer of claim 1, wherein the means for diverting the air flow into the reaction chamber includes an air flow diverter, wherein the air flow diverter is in fluid communication with a source of air and positioned such that air provided to the air flow diverter by the air source is diverted into the reaction chamber in a vortex manner.

4. The plasma-based fuel reformer of claim 3, wherein the air flow diverter is helical and is axially aligned with the longitudinal axis of the first electrode.

5. The plasma-based fuel reformer of claim 1, further comprising an electrical power source, the electrical power source being connected to the first electrode and the second electrode and providing sufficient voltage to cause a plasma arc to form between the first electrode and the second electrode in the reaction chamber.

6. The plasma-based fuel reformer of claim 5, wherein the plasma are formed is sufficient to carry out a fuel reforming reaction between the air and fuel thereby forming a hydrogen-rich gas.

7. The plasma-based fuel reformer of claim 1, further comprising an exhaust manifold, wherein the exhaust manifold is in fluid communication with the reaction chamber and is positioned so as to direct the flow of hydrogen-rich gas to an exhaust outlet.

8. The plasma-based fuel reformer of claim 1, wherein the fuel/air mixture provided to the plasma-based fuel reformer is reacted in the reaction chamber so as to form a hydrogen-rich gas.

9. A plasma-based fuel reformer comprising: a first electrode composed of an electrically conductive substance, wherein the first electrode is a cylinder having a central axis and an inner wall and an outer wall, the inner wall being smaller in diameter than the outer wall and defining an axial reaction chamber and wherein the first electrode has a first end and a second end; a second electrode including: a second electrode body surrounding a tubular fuel line, the fuel line having a first end and second end in which the first end is in fluid communication with a fuel source; and an insulator wherein the insulator is defined by a first wall having a diameter slightly less than the diameter of the inner wall of the first electrode and a second wall having a diameter slightly greater than the diameter of the second electrode body and wherein the insulator is positioned between the first electrode and the second electrode to prevent the formation of an electrical discharge outside of the reaction chamber.

10. The plasma-based fuel reformer of claim 9, wherein the second end comprises an exhaust manifold, the exhaust manifold being in fluid communication with the reaction chamber.

11. The plasma-based fuel reformer of claim 9, wherein between the first end and a second end, an air inlet manifold is in fluid communication with the reaction chamber.

12. The plasma-based fuel reformer of claim 9, wherein the first electrode further includes a heat sink, wherein the heat sink is in thermal connection with the first electrode.

13. The plasma-based fuel reformer of claim 9, wherein the fuel line is axially aligned with the axis of the first electrode.

14. The plasma-based fuel reformer of claim 9, further comprising a fuel injector tip, the fuel injector tip being in fluid communication with the second end of the fuel line and positioned so as to inject fuel into the reaction chamber.

15. The plasma-based fuel reformer of claim 14, further comprising an air flow baffle surrounding the fuel line and positioned between the fuel injector tip and the second electrode body.

16. The plasma-based fuel reformer of claim 15, wherein the air flow baffle is a helix that is axially aligned with the axis of the first electrode.

17. The plasma-based fuel reformer of claim 9, further comprising a planar annular disk plasma arc platform, wherein the planar annular disk is in electrical communication with the second electrode and is positioned within the reactor chamber such that a plasma arc is formed between the planar annular disk plasma arc platform and the inner wall of the first electrode.

18. The plasma-based fuel reformer of claim 9, further comprising a first pair of pressure sealing elements positioned between the first electrode and the insulator so as to form a pressure tight seal between the two, and a second pair of pressure sealing elements positioned between the second electrode body and the insulator so as to form a pressure tight seal between the two.

19. The plasma-based fuel reformer of claim 18, wherein the first and second pair of pressure sealing elements are O-rings.

20. The plasma-based fuel reformer of claim 9, further comprising an endcap, wherein the endcap is mechanically connected onto the first end of the first electrode and prevents the second electrode from moving relative to the first electrode.

21. The plasma-based fuel reformer of claim 20, wherein the end cap is composed of an electrical insulator.

22. A plasma-based fuel reformer comprising:
a first electrode, wherein the first electrode has an inner and outer wall and a longitudinal axis, the inner wall defining a reaction chamber;
a second electrode, the second electrode being axially aligned with the longitudinal axis of the first electrode and positioned in the reaction chamber such that when an electrical voltage is applied to the first and second electrodes a plasma arc forms between the first and the second electrode in the reaction chamber;
an insulator, wherein the insulator is positioned between the first and the second electrode so as to prevent the formation of a plasma arc between the first and the second electrodes except in the reaction chamber;

means for providing a fuel/air mixture to the reaction chamber; and means for diverting the air flow into the reaction chamber having an air flow diverter that is helical and axially aligned with the longitudinal axis of the first electrode.

23. The plasma-based fuel reformer of claim 22, wherein the means for providing a fuel/air mixture to the reaction chamber includes a fuel line axially aligned with the second electrode, the fuel line having a first end and a second end, the first end being in fluid communication with a fuel source and the second end being in fluid communication with a fuel injector, the fuel injector being positioned to inject fuel into the reaction chamber.

24. The plasma-based fuel reformer of claim 22, wherein the means for diverting the air flow into the reaction chamber is in fluid communication with a source of air and positioned such that air provided to the air flow diverter by the air source is diverted into the reaction chamber in a vortex manner.

25. The plasma-based fuel reformer of claim 22, further comprising an electrical power source, the electrical power source being connected to first electrode and the second electrode to provide sufficient voltage to cause a plasma arc to form between the first electrode and the second electrode in the reaction chamber.

26. The plasma-based fuel reformer of claim 22, further comprising an exhaust manifold, wherein the exhaust manifold is in fluid communication with the reaction chamber and positioned so as to direct the flow of hydrogen-rich gas to an exhaust outlet.

* * * * *